L. A. ASPINWALL.
POTATO PLANTER.
APPLICATION FILED SEPT. 11, 1917.

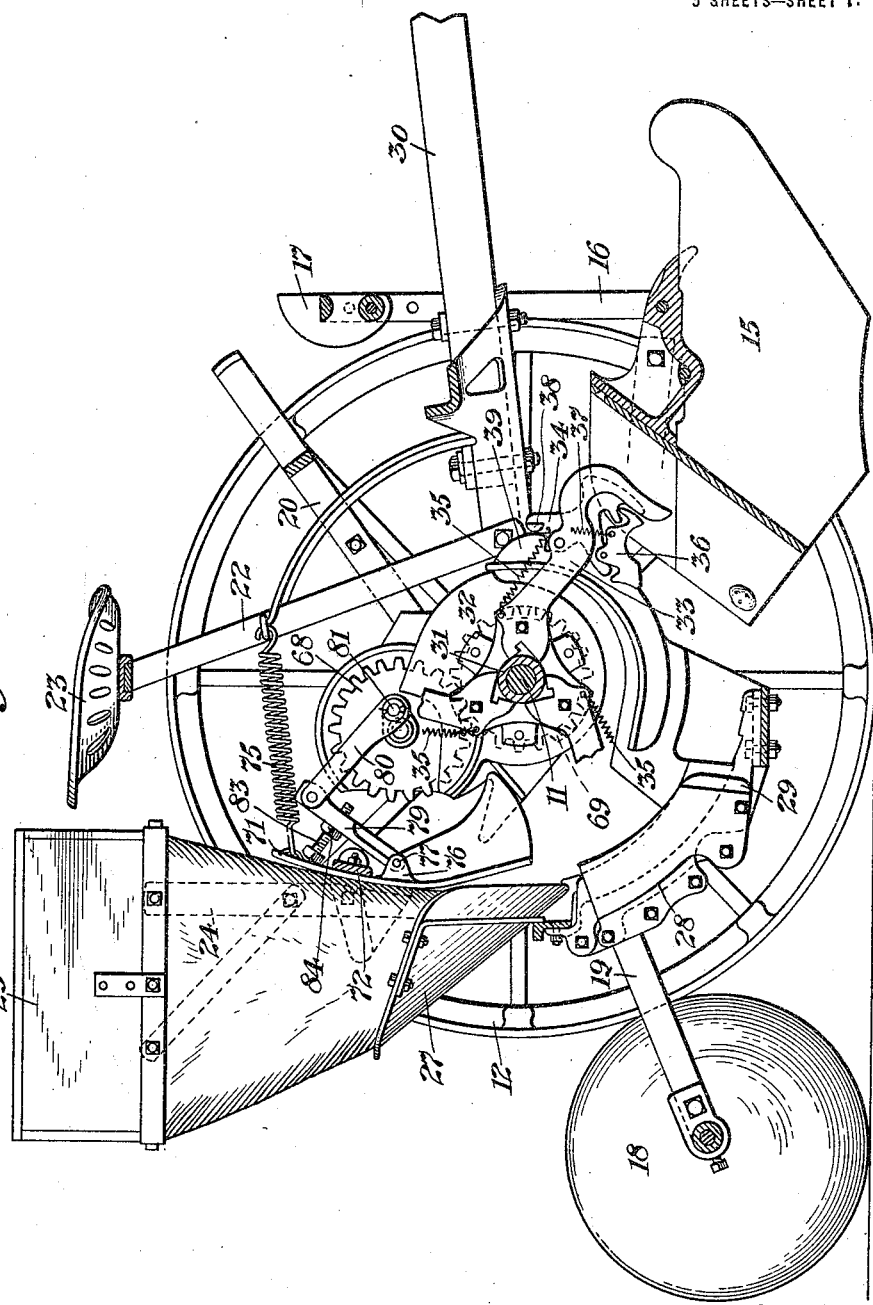

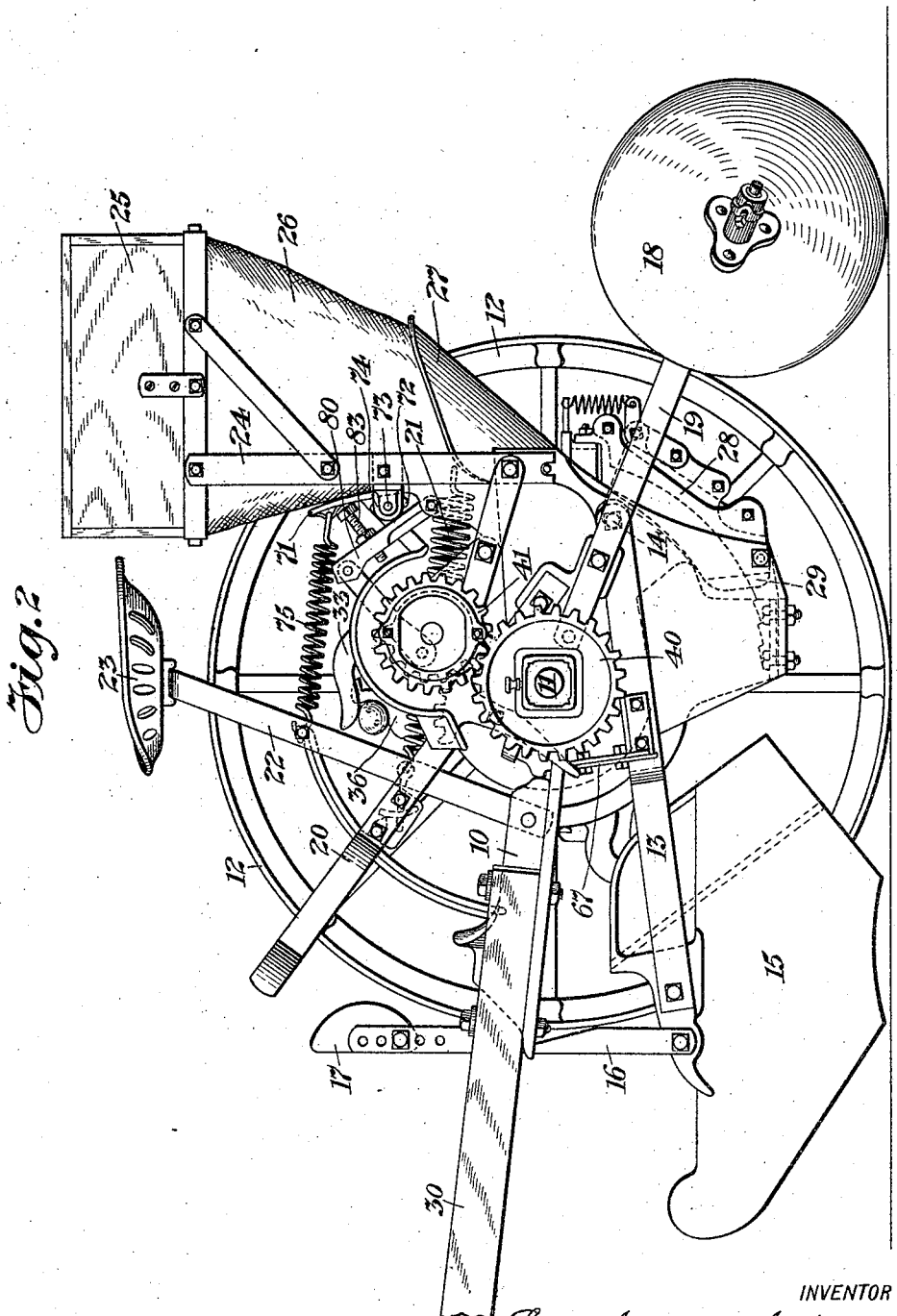

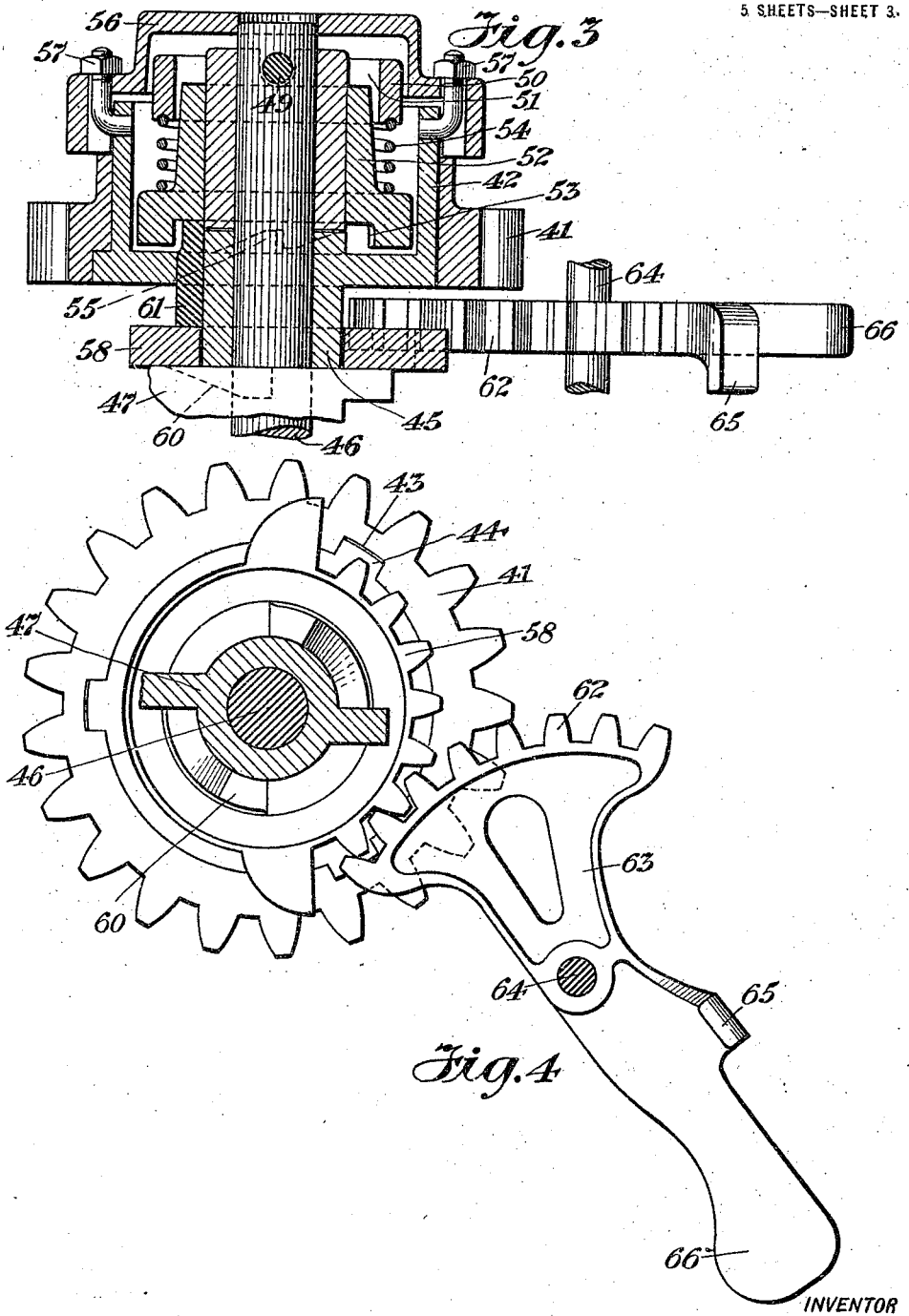

1,296,255.

Patented Mar. 4, 1919.
5 SHEETS—SHEET 4.

INVENTOR
Lewis Augustus Aspinwall
BY
HIS ATTORNEYS

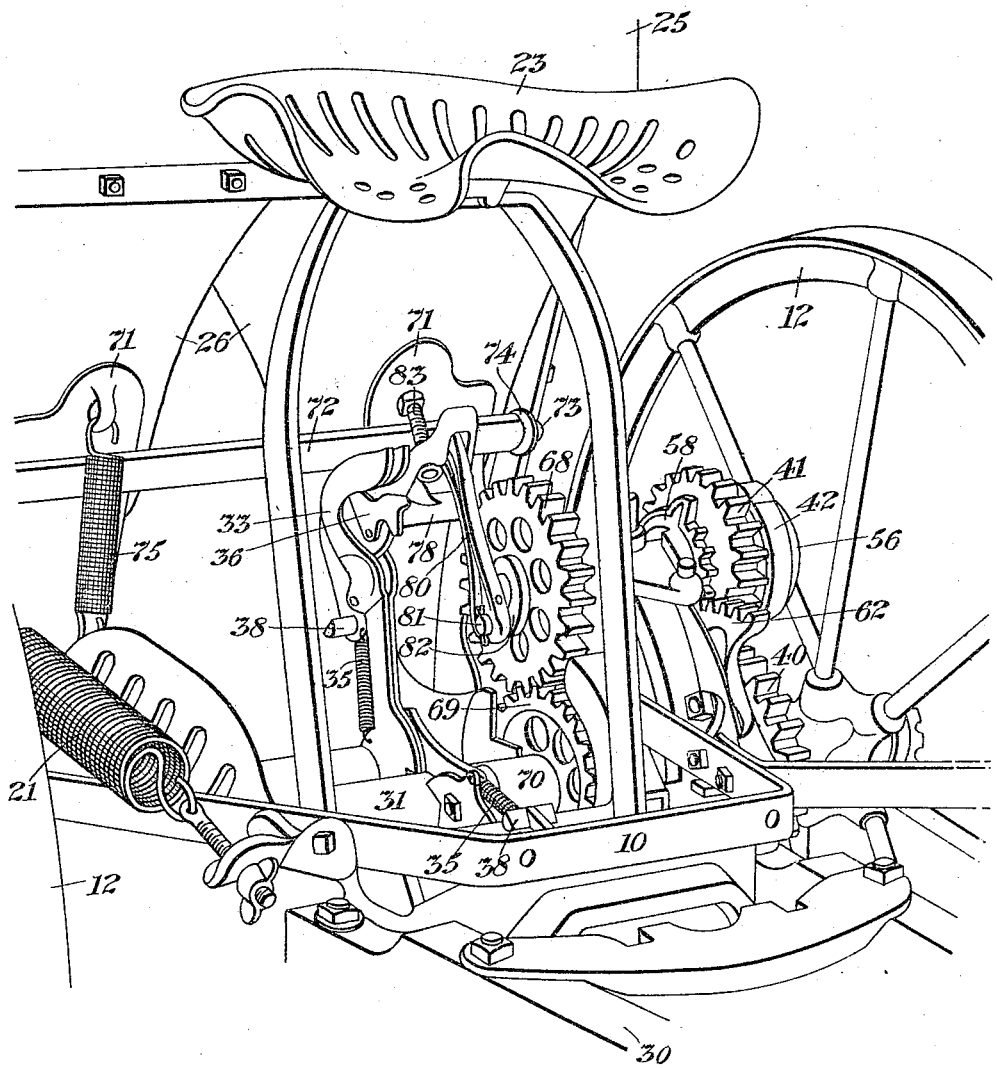

UNITED STATES PATENT OFFICE.

LEWIS AUGUSTUS ASPINWALL, OF JACKSON, MICHIGAN, ASSIGNOR TO ASPINWALL MFG. CO., A CORPORATION OF MICHIGAN.

POTATO-PLANTER.

1,296,255.      Specification of Letters Patent.      Patented Mar. 4, 1919.

Original application filed August 25, 1916, Serial No. 116,795. Divided and this application filed September 11, 1917. Serial No. 190,714.

*To all whom it may concern:*

Be it known that I, LEWIS AUGUSTUS ASPINWALL, residing in Jackson, in the county of Jackson and State of Michigan, have invented an Improvement in Potato-Planters, of which the following is a specification.

My present invention relates to a potato planter and this application is a division of application Serial No. 116,795 filed by me on August 25, 1916 for Letters Patent for an improvement in potato planters. That application has matured into Patent No. 1,240,529, bearing the date of Sept. 18, 1917. In the application aforesaid the invention was made to relate more particularly to the construction of the pickers and concaves associated therewith for receiving, gripping, and releasing the potatoes in the planting of the same. The present application relates more particularly to the clutch mechanism and devices operated through the same for actuating the feed gates of the hoppers, and also the picker devices so that these parts are operated and potatoes fed and deposited at the will of the operator.

I am aware that heretofore the picker arms as well as other parts of a potato planter have been driven indirectly from the main shaft or axle of the apparatus. My present invention relates to a novel form of clutch mechanism for this purpose and also to the mechanism for actuating the feed gates when the clutch is engaged so that potatoes are fed as hereinbefore stated only when the picker arms are in operation to receive, carry and deposit the same into the furrows made by the plow of the planter, and the construction of these parts to which the present invention relates will be hereinafter more particularly described.

In the drawing:

Figure 1 is a sectional elevation illustrating my improved potato planter.

Fig. 2 is an elevation of the same taken on the other side of the machine.

Fig. 3 is a sectional plan of the clutch mechanism employed.

Fig. 4 is a sectional elevation of the same.

Fig. 7 is a perspective view illustrating the parts of the apparatus to which the present invention more particularly relates.

Figure 5:
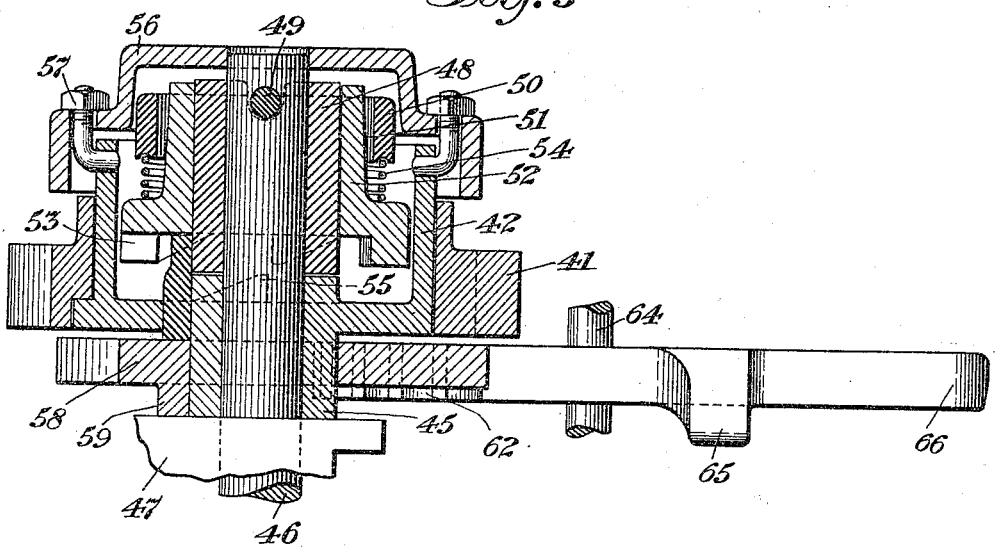
Fig. 5 is a sectional plan of the clutch mechanism in Fig. 3 but showing the parts in their other positions.

The potato planter made in accordance with this invention preferably comprises a suitably constructed frame 10 in which there is mounted in a fixed position an axle 11. On the ends of the axle 11, wheels 12 are mounted, these wheels being the traction wheels of the apparatus. As is customary I also employ plow bars 13 which are pivotally connected at one end in the frame of the planter as indicated at 14 and at its opposite end carries the plow 15. Associated with these parts there is a lifter bar 16 connected at its lower end to the plow and provided at its upper end with a handle 17 by which the plow and plow bar may be raised and lowered. As is also customary, the planter includes furrow coverers 18. These are suitably secured to bars 19 mounted in the frame of the machine and provided with a foot bar 20 by which the coverers may be raised from their operative positions against the action of the spring 21 which normally maintains the coverers in place. 22 designates a post fixed at its lower end in the frame of the machine and fitted at its upper end with a seat 23 for the driver. Also connected in the frame of the machine there are uprights 24 to which are secured fixed receptacles 25 and flexible hoppers 26 into which the potato seeds to be planted are placed and permitted to gravitate to the chutes 27 from which and the flexible hoppers the seeds are fed through the gates hereinafter described, to the concaves, which latter preferably comprise concave casings 28 secured in the frame of the machine, and inner members 29 removably mounted therein as more particularly described in my aforesaid application. Secured to the frame 10 there is also a shaft or pole 30 to which the draft animals are harnessed.

This apparatus also includes sets of pickers each preferably comprising three picker arms mounted in spaced positions on the sleeves 31 surrounding the axle 11. These sleeves are suitably connected so that the picker arms move in unison and each sleeve is provided with a flange 32 to which the picker arms 33 are attached. Each picker arm at its outer end is preferably bifurcated and fitted with a swinging member 34 normally maintained in position by a spring 35, and each swinging member 34 carries a tongue 36 normally held in place relatively to its swinging member by a spring 37 so that through the action of the picker arm its swinging member and tongue with the coöperation of the concaves, the potatoes are received, gripped and released so as to be deposited into a furrow opened by the plow. These parts are actuated by means of a lug 38 on each swinging member, and a cam 39 on the frame of the machine with which the lugs 38 contact to open the jaw formed between the end of each picker arm and the swinging member and tongue associated therewith. These parts are more particularly shown and described in my application aforesaid.

On the end of the axle 11 adjacent the left hand wheel of the planter as clearly shown in Fig. 7, there is a gear 40. This gear is suitably connected to the wheel 12 so as to turn therewith. Meshing with the gear 40 is a gear 41. This gear 41 is mounted on a clutch casing 42. As illustrated particularly in Figs. 4 and 6, the gear 41 is provided with spaced recesses 43 which receive lugs 44 provided for this purpose on the clutch casing 42 in order to so connect these parts that they will turn together. The hub 45 of the clutch casing is mounted on a counter-shaft 46, one end of which is journaled in a bearing 47 forming part of or suitably connected to the frame of the machine. On the counter-shaft 46 there is a sleeve 48 and the sleeve 48 is secured to the counter-shaft by means of a pin 49 or otherwise. On the sleeve 48 and adjacent the outer end thereof, there is a flange 50. This flange is provided with openings 51 adapted to receive parts of a clutch member 52 mounted to slide on the sleeve 48. On the inner end of the clutch member 52 there are clutch teeth 53, and on the adjacent surface of the clutch casing there are similar but oppositely disposed clutch teeth 55. Normally, the clutch member 52 is maintained in the position shown in Fig. 3 with the teeth 53 and 55 in engagement by means of a spring 54, surrounding the clutch member and extending between the teeth at the end of the same and the adjacent side of the flange 50. At its outer end the clutch casing is provided with a cap 56 in which the extremity of the counter-shaft 46 is journaled, and this cap 56 may be secured to the clutch casing by means of suitable stud bolts 57 or otherwise.

Mounted freely on the hub of the clutch casing I employ a shitable segmental gear 58. On the face of this segmental gear adjacent the bearing 47 there is an incline face 59 and in the adjacent surface of the bearing 47 there is an incline face 60. Extending between the shiftable segmental gear 58 and the clutch member 52 there are shift bars, one of which is illustrated at 61 in Figs. 3 and 5. Each of these shift bars extends through and is journaled in an opening provided therefor in the clutch casing 42 and as illustrated, these shift bars slide against the surfaces of the hub 45 of the clutch casing and against the surface of the sleeve 48. Meshing with the shiftable segmental gear 58 there is a segmental gear 62. This gear 62 is carried by an arm 63 pivotally mounted at 64 in the frame of the machine. The arm 63 is also provided with a foot piece 65 and an extension 66 adapted to contact with a bracket 67 fixed on the plow bar 13 as is shown in Fig. 2.

At the inner end of the counter-shaft 46 there is mounted a gear 68. This gear 68 meshes with a gear 69 the hub 70 of which is mounted on the axle 11. The hub 70 is suitably connected with the adjacent sleeve 31 and by and through the same in the operation of the machine the picker arms are revolved.

The flexible hoppers 26 to which reference has hereinbefore been made are as herein illustrated, preferably employed in pairs and associated with each flexible hopper there is a feed gate 71 through the actuation of which the potato seeds are fed from the hoppers to the concaves. These feed gates 71 are preferably connected by a bar 72, the ends of which are fitted with trunnions 73 journaled in brackets 74 fixed in suitable positions in the frame of the planter, and the feed gates are normally held in a closed position by means of a spring 75. One of the feed gates below its pivotal point is provided with brackets 76 in which there is secured a rod 77. Journaled on this rod 77 there is a sleeve 78 and connected to and extending from the sleeve 78 is an arm 79. The free end of the arm 79 is pivotally connected to a link 80 which at its opposite end is pivotally mounted on a crank pin 81 fixed in the hub 82 of the gear wheel 68. Adjustably placed in the arm 79 is a bolt 83. This may be locked in any adjusted position by means of a nut 84 or otherwise, and a portion of the feed gate is maintained against the free end of the bolt 83 by the spring 75.

Figure 6:
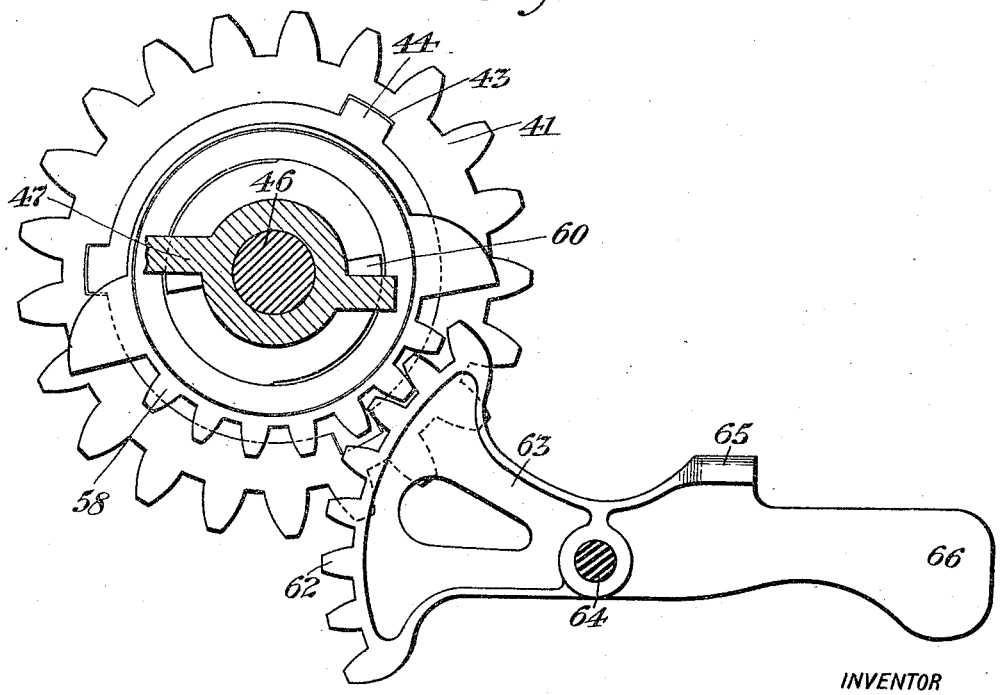
Fig. 6 is a sectional elevation of the parts of the clutch mechanism as shown in Fig. 5.

In the operation of the hereinbefore described apparatus the clutch mechanism is in its normal position disengaged as shown in Figs. 5 and 6 and this disengagement is made positive by lifting the plow bar 13 when as will be understood the bracket 67 contacts with the extension 66 of the arm 63 moving the arm from the position shown in Fig. 4 to that shown in Fig. 6. In so doing the segmental gear 62 operates the shiftable segmental gear 58 and in turning the same the incline face 59 of the shiftable gear rides over the incline face 60 on the bearing 47 and forces the shift bars 61 inwardly, thereby moving the clutch member to disengage the teeth thereof against the action of the spring 54. In so doing as will be understood, the clutch member is entirely disengaged and the parts of the apparatus made inoperative. When in operation, the clutch parts are moved in the opposite direction by pressing the foot against the foot piece 65 and forcing the arm 63 to the position shown in Fig. 4. In so doing the shiftable segmental gear 58, the shift bar 61, and the clutch member 52 are moved through the action of the spring 54 so as to throw the teeth of the clutch into engagement. When this position is assumed the countershaft 46 will be turned through the gear 40 and the gear 41 acting through the members of the clutch. The gear 68 will then turn the gear 69 to operate the picker devices and simultaneously the gear 68 through the link 80, the arm 70 and the sleeve 78, the rod 77, will periodically operate the feed gate to which these parts are attached and the other feed gate will be operated simultaneously and in unison with this feed gate by the bar 72 by which the feed gates are connected.

I claim as my invention:

1. In a potato planter, a frame, an axle mounted therein, a hopper, a feed gate mounted to swing in the said frame, an arm pivotally connected at its lower end to the feed gate an appreciable distance from the upper end thereof, an adjustable member for determining the relationship between the said arm and the upper end of the feed gate, means for maintaining the feed gate against the said adjustable member, and means for actuating the said arm so that with the co-action of the aforesaid means, the feed gate opens and closes.

2. In a potato planter, a frame, an axle, a hopper, a feed gate mounted to swing in the said frame, an arm pivotally connected at its lower end an appreciable distance from the upper end of the said feed gate, a member adjustable in said arm and extending between the same and the adjacent surface of the feed gate to determine the distance between the same, means acting against the upper end of the feed gate to maintain the same against the end of the adjustable member, and means for actuating the said arm so that through the co-action of the aforesaid means, the feed gate is opened and closed.

3. In a potato planter, a frame, an axle mounted therein, a hopper, a feed gate mounted to swing in the said frame, an arm pivotally connected at its lower end to the said feed gate an appreciable distance from the upper end thereof, a member adjustable in the said arm and extending between the same and the adjacent surface of the feed gate to determine the relationship between the same, a spring extending between the upper end of the said feed gate and a portion of the said frame to maintain the upper end of the feed gate against the said adjustable member, and means for actuating said arm so that through the coöperation of the said spring, the feed gate is opened and closed.

4. In a potato planter, a frame, an axle mounted therein, a hopper, a feed gate mounted to swing in the said frame, an arm pivotally connected at its lower end to the said feed gate an appreciable distance from the upper end thereof, a member adjustable in the said arm and extending between the same and the adjacent surface of the feed gate to determine the relationship between the same, a spring extending between the upper end of the said feed gate and a portion of the said frame to maintain the upper end of the feed gate against the said adjustable member, a gear, a shaft on which the said gear is mounted, a link connecting the upper end of the said arm with a pin on the said gear, and means for connecting and disconnecting the said shaft with the said axle.

5. In a potato planter, a frame, an axle mounted therein, a hopper, a feed gate mounted to swing in the said frame, an arm pivotally connected at its lower end to the said feed gate an appreciable distance from the upper end thereof, a member adjustable in the said arm and extending between the same and the adjacent surface of the feed gate to determine the relationship between the same, a spring extending between the upper end of the said feed gate and a portion of the said frame to maintain the upper end of the feed gate against the said adjustable member, a bearing frame secured to the said frame, a counter shaft mounted in the said bearing frame, a gear on the counter shaft, a link connecting the free end of the said arm with a pin in the said gear, and means for connecting the said counter shaft to and disconnecting the same from the said axle.

6. In a potato planter, a frame, an axle mounted therein, a hopper, a feed gate mounted to swing in the said frame, an arm pivotally connected at its lower end to the feed gate an appreciable distance from the upper end thereof, an adjustable member for determining the relationship between the said arm and the upper end of the feed gate, means for maintaining the feed gate against the said adjustable member, a plurality of pickers, means for operating the said pickers and simultaneously actuating the said arm so that through the co-action of the means for maintaining the feed gate against the adjustable member, the feed gate is opened and closed.

7. In a potato planter, a frame, an axle mounted therein, a hopper, a feed gate mounted to swing in the said frame, an arm pivotally connected at its lower end to the said feed gate an appreciable distance from the upper end thereof, a member adjustable in the said arm and extending between the same and the adjacent surface of the feed gate to determine the relationship between the same, a spring extending between the upper end of the said feed gate and a portion of the said frame to maintain the upper end of the feed gate against the said adjustable member, a gear, a shaft on which the said gear is mounted, a link connecting the upper end of said arm with a pin in said gear, and a plurality of pickers operated from the said gear.

Signed by me this 7th day of Sept., 1917.

LEWIS AUGUSTUS ASPINWALL.

Witnesses:
GEO. N. WHITNEY,
E. D. BARRON.

Copies of this patent may be obtained for five cents each, by addressing the "Commissioner of Patents, Washington, D. C."